United States Patent

Burens

[15] 3,683,208
[45] Aug. 8, 1972

[54] POWER SUPPLY CIRCUIT ARRANGEMENT UTILIZING REGENERATIVE CURRENT FEEDBACK

[72] Inventor: James H. Burens, Worthington, Ohio

[73] Assignee: North Electric Company, Galion, Ohio

[22] Filed: Dec. 23, 1970

[21] Appl. No.: 101,011

[52] U.S. Cl. .................307/296, 207/275, 307/254
[51] Int. Cl. ..............................................H03k 3/30
[58] Field of Search.............307/275, 282, 254, 296; 331/112

[56] References Cited

UNITED STATES PATENTS

| | | | |
|---|---|---|---|
| 3,219,906 | 11/1965 | Keller et al. | 307/275 |
| 2,994,840 | 8/1961 | Dorsman | 307/282 |
| 3,120,615 | 2/1964 | Sheehan | 307/275 |
| 3,546,627 | 12/1970 | Baugher | 307/254 |
| 2,772,370 | 11/1956 | Bruce et al. | 307/282 |

Primary Examiner—Stanley D. Miller, Jr.
Assistant Examiner—Harold A. Dixon
Attorney—Johnson, Dienner, Emrich, Verbeck & Wagner

[57] ABSTRACT

A power supply circuit having an input circuit over which signals at logic levels control a pair of current pulse generators to alternately supply base current over a multi-winding current transformer to the base elements of a pair of output switching transistors, each of which is alternately turned on to permit current to flow through an output transformer winding and also through a feedback winding of the current transformer to supply regenerative base current for driving the effective one of the output transistors into saturation; a further control transistor is responsive to logic level signals to control the turnoff of each output transistor after a timed interval by shorting a winding on the current transformer.

12 Claims, 8 Drawing Figures

INVENTOR
JAMES H. BURENS

FIG. 2  V_CE (Q4) 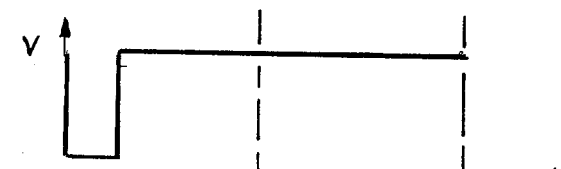
FIG. 3  I_B1 (Q1) 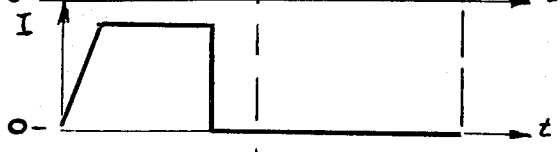
FIG. 4  I_T1 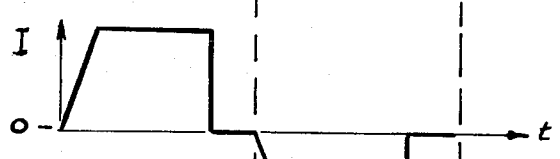
FIG. 5  V_out 
FIG. 6  V_CE (Q5) 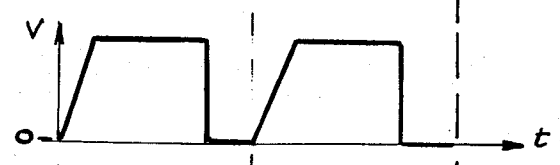
FIG. 7  V_CE (Q3) 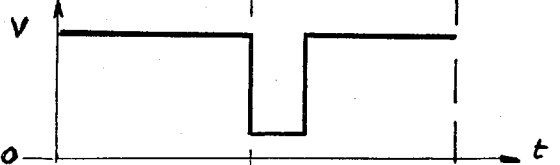
FIG. 8  I_B2 (Q2) 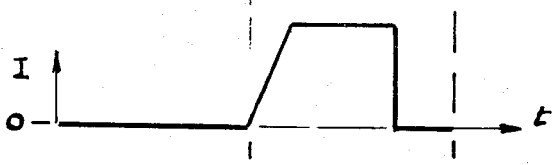

_(1)_

POWER SUPPLY CIRCUIT ARRANGEMENT UTILIZING REGENERATIVE CURRENT FEEDBACK

BACKGROUND OF THE INVENTION

1. Field of the Invention

This invention relates to power supplies, and more particularly, to a power supply having a current pulse generator operative with a current transformer to control two output switching transistors.

2. Description of the Prior Art

In certain prior art inverters, the base drive for controlling the transistors which convert a constant DC voltage into square wave or alternating voltage was obtained from a power conversion circuit having an associated by discrete regulator circuit. The base drive for the controlled transistors was powered from the regulator circuit and was switched on and off either directly by means of a solid state switching device or by means of a voltage transformer. In such arrangement a constant voltage signal is applied from the regulator circuit to the controlled transistor regardless of the load, and as a result the light load efficiency of the circuit is significantly reduced.

An extension of such prior art comprised the development of inverters in which a current controlled feedback transformer was used to feed back current to supply the base drive for the controlled transistors. This arrangement eliminated the need for a conversion circuit and the associated regulator circuit. The shortcoming in such an arrangement, however, lies in the fact that the circuit requires two transformers, and difficulty may exist in providing a dc component in the secondary of the transformer which is proportional to the collector current in the controlled transformer.

SUMMARY OF THE INVENTION

The present invention provides a power supply having a control circuit which includes a base drive circuit for controlling switching of a pair of output switching transistors. The control circuit basically comprises a first and a second current pulse generator which are responsive to logic level signals to provide start signals over an associated multi-winding current transformer. The multi-winding current transformer in turn couples the base drive signals provided by the current pulse generators to the base drive circuits of the output switching transistors.

As a current pulse is provided over one primary winding of the current transformer, the current over such winding is coupled by transformer action to the transformer secondary winding, and by reason of the poling of the transformer secondary windings, one of the output transistors is biased to conduct, and the other output transistor is reverse-biased off.

When an output switching transistor is turned on, current from a power source is conducted over the collector-emitter circuit of the transistor and through the primary winding of an output transformer and over a series connected feedback winding of the current transformer. The current flow over the feedback winding causes regenerative feedback current to be fed to the base drive circuits of the output transistors. This regenerative current (which takes over for the initial start pulse provided by the control circuit) continues until the transistor is saturated. The transistor is thus held to a forced gain for all currents including both variations in the power source voltage and variations in the load current. It can be seen therefore that the initial turn on of each output switching transistor is controlled by a current pulse generator which responds to logic levels and an output transistor, once rendered conductive, is driven to and held in saturation by the regenerative current feedback.

It is pointed out that the power supply provided by the present invention which employs current pulse generators with a current transformer to initiate conduction of the output transistor, and a regenerative current feedback circuit to drive the output transistor into saturation has inherently better light load efficiency than power supplies of conventional design. That is, in conventional designs in which voltage pulses are provided by a control circuit to drive the output transistors, the system is required to provide the same value voltage pulse for light loads as for heavy loads. In such circuit, the base loss at the output transistors is the same whether the output load is light or heavy, and the inefficiency of such arrangement is readily apparent. In the present invention, the base drive current is proportional to the output transistor collector current, and the base drive is reduced automatically with a drop in level. As a result, little loss is experienced in base power conversion, and there is no need for a regulator circuit with its inherent loss for the base drive circuit.

Another feature of the invention is that variations in the duty cycle can be programmed by adjusting the time in each control cycle during which base drive is supplied to the output switching transistors. The duration for which the output transistors are enabled is determined by the time at which a logic level pulse is applied to a control transistor which shorts out a winding on the current transformer.

A further feature of the invention is that the same control circuit can be used to control a low power output switching stage or a high power output switching stage. Accordingly, the control circuit format can be standardized over a wide range of power outputs.

BRIEF DESCRIPTION OF THE DRAWINGS

FIGS. 2–8 show current and voltage waveforms which occur at various points in the circuit of FIG. 1.

GENERAL DESCRIPTION

Figure 1:
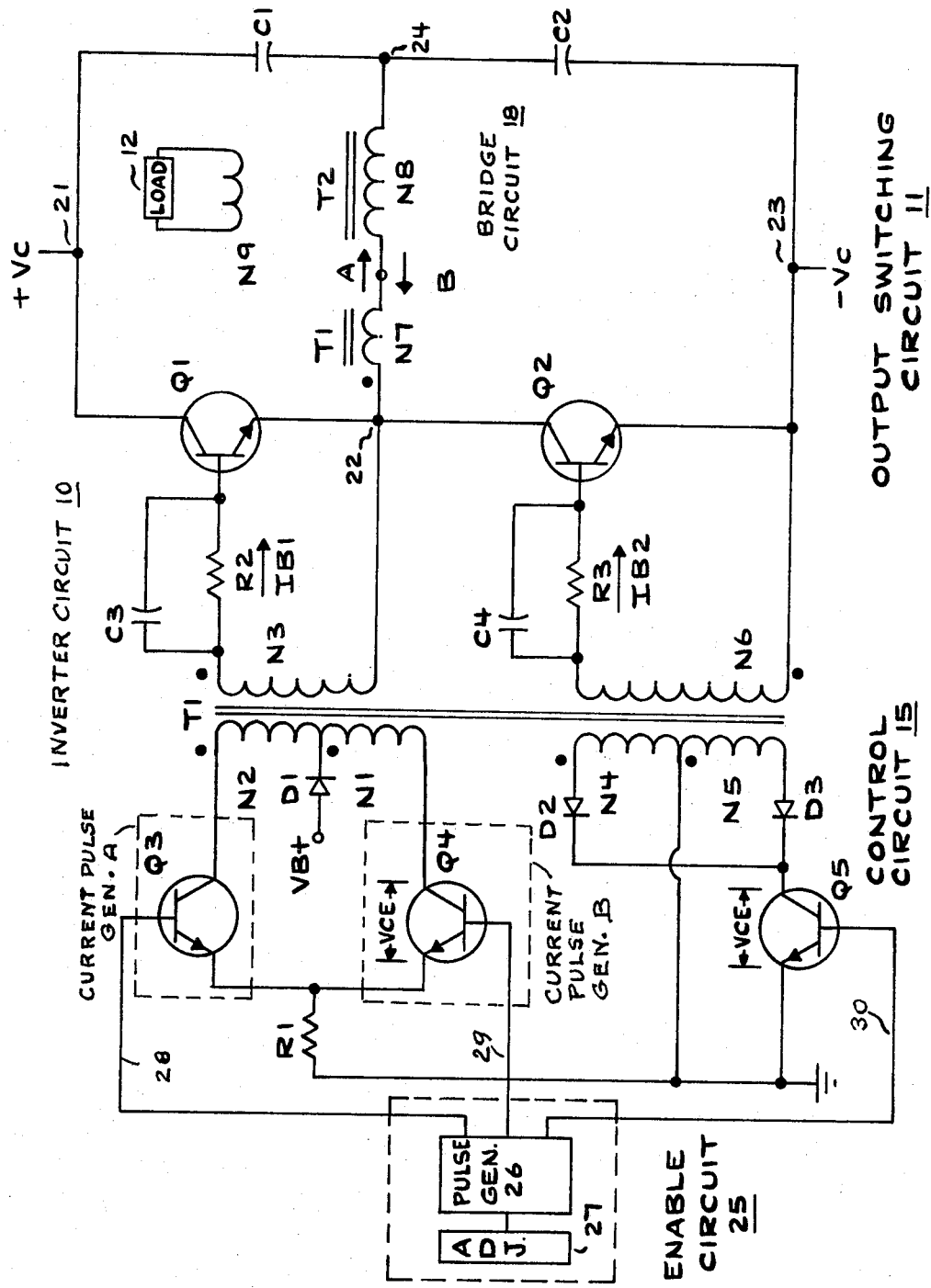
FIG. 1 is a schematic circuit diagram of a power inverter provided by the present invention.

Referring to the schematic circuit diagram of FIG. 1, the invention is shown as indicated in a DC to AC inverter; however, such showing of the novel base drive circuit in an inverter circuit is by way of example only, and is not intended as a limitation to the scope of the invention.

As there shown inverter 10 includes a switching circuit 11 having a pair of switching transistors Q1 and Q2 which are operable, when switched, to alternately apply power from a power source VC to a load 12 via an output transformer T2. The switching of transistors Q1 and Q2 is controlled by a control circuit 15 which includes a pair of current pulse generator circuits A, B, including transistors Q3 and Q4 respectively connected to the primary windings of a current transformer T1 having windings N1–N7 to thereby alternately supply base drive current to the switching transistor Q1 and Q2.

The current pulse generators A, B are in turn controlled by an enabling circuit 25 which provides logic level pulses for selectively enabling the current pulse generator A, B to effect turnon and turnoff of the switching transistors Q1 and Q2. A turnoff circuit including transistor Q5 is responsive to output pulses from enabling circuit 25 to turn off the enabled one of the switching transistors Q1, Q2.

DETAILED DESCRIPTION OF A PREFERRED EMBODIMENT

With reference to FIG. 1, the output switching circuit 11 comprises transistors Q1 and Q2 and capacitors C1 and C2 of the inverter arranged in a bridge type configuration which employs a split capacitor design.

The bridge circuit 18 comprises four arms arranged in ring fashion forming four junctions 21–24. The collector-emitter circuit of transistor Q1 is connected between junctions 21 and 22, and the collector-emitter circuit of transistor Q2 is connected between junctions 22 and 23 forming two arms of the bridge circuit 18. Capacitor C1 is connected between junctions 24 and 23 forming the other two arms of the bridge circuit. The power source Vc has a positive terminal connected to junction 21 and a negative terminal connected to junction 23.

Output transformer T2 has a primary winding N8 connected in series with a feedback winding N7 of a current transformer T1 between junctions 22 and 24. The load 12 is connected across the secondary winding N9 of the output transformer T2.

Base drive current is fed to transistor Q1 over a secondary winding N3 of current transformer T1 which winding has one end connected to the emitter of transistor Q1 and the other end connected through a resistor R2 to the base of transistor Q1. Capacitor C3 is connected in shunt with resistor R2.

In a similar manner base current for transistor Q2 is fed over a secondary winding N6 of the current transformer T1, which winding has one end connected to the emitter of transistor Q2 and a second end connected through a resistor R3 to the base of transistor Q2. Resistor R3 is shunted by a capacitor C4.

The capacitors C3, C4 are used to improve the switching time of transistors Q1 and Q2 respectively. The base resistors R2 and R3 are used to equalize the base drive to transistors Q1 and Q2.

The base drive current for transistors Q1 and Q2 is provided by the current pulse generators A, B in control circuit 15 which respectively include driving transistors Q3 and Q4. The control circuit 15 is operable to effect both the turn on and the turn off of the output switching transistors Q1 and Q2 in such a way that when one of the output transistors, such as transistor Q1 is forward biased, the other output transistor Q2 is reverse biased. Current generator B includes transistor Q4 which is operative in response to logic level signals over conductor 29 to provide forward base drive for transistor Q2. Control transistor Q5 as will be shown is operative in response to logic level signals over conductor 30 to effect turnoff of transistors Q1 and Q2. 85 is fed over a circuit path which extends from voltage source Thus, the control circuit 15 basically comprises a pair of current pulse generators A, B connected across a voltage source VB which in one embodiment was a twelve volt source. The current provided by current pulse generator B is fed over a circuit path which extends from voltage source VB+ over diode D1, primary winding N1 of current transformer T1, the collector emitter path of transistor Q4, and limiting resistor R1 to ground (VB−). The current provided by pulse generator A is fed over a circuit path which extends from voltage source VB+ over diode D1, primary winding N2 of the transformer T1, transistor Q3 and limiting resistor R1 to ground.

The base of transistor Q4 is connected over conductor 29 to a logic signal output of an enable circuit 25, and the base of transistor Q3 is connected over conductor 28 to a logic signal output of the enable circuit 25.

As current pulse generator B is enabled, a current pulse is fed over winding N1 to initiate conduction by transistor Q1. That is, with receipt of a logic pulse over conductor 29 from the enabling circuit, transistor Q4 is turned on and collector current of transistor Q4 flows over the circuit path including winding N1 and a current pulse is coupled to windings N3 and N6 of the transformer T1. The polarity of winding N1 relative to the polarities of windings N3 and N6 which are connected in the base drive circuits of transistors Q1 and Q2 is such that voltages induced in windings N3 and N6 due t the flow of current in winding N1 will provide forward bias for transistor Q1 and reverse bias for transistor Q2. The polarity of the windings N1–N7 of transformer T1 are indicated in FIG. 1 by the dots adjacent one end of each winding.

On the other hand, since as shown by the polarity dots in FIG. 1, winding N2 associated with driving transistor Q3 in current pulse generator A is of opposite polarity to winding N1, whenever transistor Q3 is turned on and collector current is flowing through winding N3, a forward bias drive will be provided over winding N6 for transistor Q2 and a reverse bias will be provided for transistor Q1. As will be seen from FIGS. 2 and 7, the enable circuit 25 provides logic signals to enable transistors Q4 and Q3 during alternate time periods. As will be shown, one of the transistors Q1 or Q2 is forward biased and initially turned on by the base drive provided by the current pulse generator A, B, the transistors are driven into saturation by the regenerative feedback current which is provided by winding N7 of the transformer T1.

Control circuit 15 further includes transistor Q5 which is operative in response to a logic pulse from enable circuit 25 to effect turnoff of each output switching transistor. Transistor Q5, as conductive, establishes a short circuit across the windings N4, N5 of the current transformer T1, which short circuit is reflected over windings N3, N6 to effectively remove base current from the one of the switching transistors Q1, Q2 which is in the saturated condition at the time.

Winding N4 in the turnoff circuit has one end connected to ground and another end connected through a diode D2 for the collector of transistor 25. Winding N5 has one end connected to ground and another end connected through diode D3 to the collector of transistor Q5. The emitter of transistor Q5 is connected to ground and the base of transistor Q5 is connected to an output of the enable circuit 25.

Windings N4 and N5 and associated diodes D2 and D3, respectively, are used to provide a positive collector potential for transistor Q5 to permit turnon of the transistor whenever a positive drive signal is applied to the base of transistor Q5. The two windings N4 and N5 are required because of the poling of windings N1, N2, N3 and N6. Whenever current is flowing through winding N3, the voltages induced in windings N4 and N5 will reverse bias diode D2 and forward bias diode D3. Thus, the voltage across winding N5 will provide a positive potential at the collector of transistor Q5 and the voltage across winding N4 will be ineffective.

Similarly, whenever current flows through winding N6, the voltages induced in windings N4 and N5 will forward bias diode D2 and reverse bias diode D3 so that a positive potential is applied to the collector of transistor Q5.

Accordingly, assuming drive transistor Q4 is conducting and that switching transistor Q1 is saturated, as base drive is now supplied to transistor Q5, the voltage which is induced in winding N5 and exists at the collector of transistor Q5 will permit transistor Q5 to turn on effectively grounding the ungrounded end of winding N5 to thus provide a short circuit across winding N5. The shorted winding is reflected to winding N3 of the base drive circuit of transistor Q1 permitting capacitor C3 to discharge through the emitter base circuit of transistor Q1, causing transistor Q1 to turn off. The turnoff of power transistor Q2 is effected in a similar manner by capacitor C4 during the alternate period of conduction by transistor Q2.

CIRCUIT OPERATION

For purposes of illustration at the operation of the inverter, it is assumed that initially transistors Q1–Q5 are turned off. When a positive pulse is applied to the base of transistor Q4 in current pulse generator B by the enable circuit 25 (see FIG. 2) transistor Q4 will turn on and collector current will provide a current pulse through winding N1. The current pulse applied to winding N1 will be coupled to windings N3 and N6, charging capacitor C3, and forward biasing the base-emitter junction of transistor Q1 and reverse biasing the base-emitter junction of transistor Q2.

As transistor Q1 begins to turn on, base current IB1, having the waveform shown in FIG. 3, will flow in the base drive circuit of transistor Q1. In addition, current IT1 (FIG. 4) will flow from the supply VC over the collector-emitter circuit of transistor Q1, and windings N7 and N8 to the junction 24 between capacitor C1, C2 which is normally at approximately ½VC.

The polarity of feedback winding N7 is such as to provide regenerative feedback to the base drive circuit of the output switching transistor which is being turned on. Accordingly, when transistor Q1 is turned on, current IT1 flowing from junction 22 to junction 24 and thus through winding N7 in the direction of arrow A will establish a current flow in winding N3. This current will reinforce the current flowing in winding N3 by reason of the current pulse applied to winding N1.

Consequently, the base drive to transistor Q1 will be increased and the conduction of transistor Q1 will increase. It should be observed that once the feedback current approaches a significant value, the output pulse from the current generator B is of little effect. Stated in another manner, the current pulse provided over windings N1, N2 by the current pulse generators A, B are used to initiate conductivity of the transistors Q1, Q2 respectively, but the actual power for the base drive of the enabled one of the transistors Q1, Q2 is provided by the feedback current which is fed via winding N7 to the base inputs. Since the winding N7 carries the collector currents of transistors Q1, Q2, the transformer can be designed to provide the minimum base current requirements. It will also be apparent that since the base drive current to the transistors Q1, Q2 provided by the feedback winding varies with the load current, the base drive current will be reduced as the load current decreases. Such mode of operation results in increased efficiency for lighter loads as compared to systems in which a constant voltage input is provided for all load requirements.

The current IT1 (FIG. 4) flowing through windings N7, N8 of the feedback and output transformer windings respectively will increase until transistor Q1 is saturated. While the current IT1 flowing over winding N8 (in the direction of arrow A) is increasing, a positive voltage (FIG. 5) is induced in the secondary winding N9 of the output transformer T2 for application to the load 12.

The output switching transistors Q1, Q2 in the present embodiment are held to a forced gain of N3/N6 for all currents, including both variations in the supply voltage VC and loading effects reflected in the secondary winding N9 of output transformer T2.

Transistor Q1 is cutoff when transistor Q5 is enabled by a base drive pulse from the enabling circuit 25, and the voltage VCE for transistor Q5 goes to a voltage value near zero (FIG. 5) to effectively short out winding N5 of transformer T1. The shorted secondary winding N5 reflected to winding N3 permits capacitor C3 to discharge through the base-emitter circuit of transistor Q1, causing transistor Q1 to turn off.

The operation of the inverter during the second half of the control cycle is basically the same as the operation during the first half of the cycle. That is, during the second half of the control cycle transistor Q2 will be controlled in a manner similar to that described with reference to transistor Q1 to provide a discharge path for capacitor Q2 causing current IT1 (FIG. 4) to flow through the primary winding N8 of the output transformer in the direction of arrow B from junction 24 to junction 22, a direction which is the reverse to that of the current flow over winding N8 due to the switching of transistor Q1. Thus, a negative voltage, FIG. 5, will be induced in the output winding N9 of transformer N2 during the second half of the control cycle.

Since the base current drive in the novel circuit described above is dependent upon and proportional to the collector current of transistors Q1, Q2 (i.e., if the collector current is 1 amp. the base is always 0.1 amp even if the source VC varies between 40–60 v) it is apparent that the VC source does not have to be a regulated source. In addition, since transistors Q3, Q4 in the current pulse generator are used only to initiate the transistors Q1, Q2 into conduction, only small values (logic level signals in the order of 25 ma) are required, and a circuit of reduced power requirements and increased flexibility in application is provided.

While what is described is regarded to be a preferred embodiment of the invention, it will be apparent that variations, rearrangements, modifications and changes may be made therein without departing from the scope of the present invention as defined by the appended claims.

I claim:

1. In a transistorized power supply, a pair of switching transistors for providing power from a source to a load whenever one of said switching transistors is forward biased, switching means including first current pulse generator means for providing a first set of current pulses for forward biasing a first one of said switching transistors, second current pulse generator means for providing a second set of current pulses for forward biasing the second switching transistor, circuit means including transformer means having a plurality of control windings for coupling said first and second sets of current pulses from said first and second current pulse generator means to said first and second switching transistors to respectively control enablement of said first and second switching transistors and feedback means operative to provide a regenerative current for the enabled one of the transistors, enabling means for selectively controlling said first and second current pulse generator means to operate at alternate time periods, and turnoff means including a winding on said transformer means and a control transistor operable when enabled to effectively short circuit said winding on said transformer means to effect the turnoff of the forward biased one of said switching transistors.

2. A transistorized power supply as set forth in claim 1 in which said transformer means includes a first secondary winding connected to said one switching transistor, a second secondary winding connected to said second switching transistor, and a first primary winding connected to said first current pulse generator for coupling said first set of current pulses over said secondary windings to forward bias said first switching transistor and to reverse bias said second switching transistor, and a second primary winding connected to said second current pulse generator means for coupling said second set of current pulses over said secondary winding to reverse bias said first switching transistor and to forward bias said other switching transistor.

3. A transistorized power supply as set forth in claim 1 in which said enabling means provides signals at a logic level for said first and second current pulse generator means and said turnoff means, and in which said first current pulse generator includes a first drive transistor enabled by certain ones of said logic pulses to provide said first set of current pulses, and said second current pulse generator means includes a second drive transistor enabled by other ones of said logic pulses to provide said second set of current pulses, and in which said control transistor is enabled by further ones of said logic pulses at a predetermined time after either of said drive transistors is enabled.

4. A transistorized power supply as set forth in claim 1 in which said feedback means includes a winding which is connected to said transformer means to couple said regenerative current to control inputs for said switching transistors to drive the forward-biased one of the switching transistors into saturation.

5. In a transistorized power supply, an output transformer having a primary winding, a pair of switching transistors for permitting current from a source to flow through said primary winding whenever one of said switching transistors is forward biased, a first drive transistor operable when enabled to provide first current pulse signals for forward biasing one of said switching transistors during a portion of a control cycle, a second drive transistor operable when enabled to provide second current pulse signals for forward biasing the other one of said switching transistors during a different portion of the control cycle, transformer means having a plurality of control windings for coupling said first and second current pulse signals from said drive transistors to said switching transistors and a feedback winding connected in series with said primary winding of said output transformer to provide a regenerative current over certain of said control windings for driving the one of said switching transistors which is enabled by the current pulse signals into saturation, and turnoff means for effecting selective turnoff of said switching transistors including a control transistor having an output circuit, said transformer means having a turnoff winding connected to the output circuit of said control transistor, said control transistor being operable when enabled to short circuit said turnoff winding to provide a short circuit across said control windings.

6. A transistorized power supply as set forth in claim 5 which includes enabling means comprising means for providing logic pulses for enabling said first and second drive transistors respectively at alternate times to effect the alternate turn on of said switching transistors, and for enabling said control transistor at a predetermined time after the enabling of each drive transistor to effect the turnoff of the one of the switching transistors which is forward biased, the time duration for which current from said source flows over said primary winding being variable by changing the time at which said control transistor is enabled.

7. A transistorized power supply as set forth in claim 5 in which each of said drive transistors has an output circuit connected in series with an associated one of said transformer windings to permit current to flow from a source over such winding as enabled.

8. A power supply as set forth in claim 5 including a pair of capacitors connected in series across said source, said switching transistors having output circuits serially connected across said source, and wherein said primary winding and said feedback winding are serially connected between the junction of said capacitors and the junction of said switching transistor output circuits.

9. In a transistorized inverter, source means, a circuit path including an output transformer having a primary winding connected in said circuit path and a secondary winding, a first switching transistor connected between said source means and said circuit path to permit current from said source means to flow over said circuit path and said primary winding in one direction whenever said first switching transistor is forward biased, a second switching transistor connected between said source means and said circuit path to permit current from said source means to flow over said primary winding in the opposite direction whenever said second switching transistor is forward biased, a first drive transistor operable when enabled to provide first drive signals for forward biasing said first switching transistor during a portion of a control cycle, a second drive transistor operable when enabled to provide second drive signals for forward biasing said second switching transistor during a different portion of the control cycle, control transformer means having a plurality of control windings for coupling said drive signals from said drive transistors to said switching transistors and a feedback winding serially connected in said output circuit path for conducting the current flowing over said circuit path whenever one of said switching transistors is forward biased for coupling drive current to the forward biased one of the switching transistors for driving said forward biased switching transistor into saturation, enabling means for providing logic pulses for enabling said drive transistors at alternate times during said control cycle and turnoff means including a turnoff winding on said control transformer and a control transistor operable when enabled to effectively short circuit said turnoff winding to effect the turnoff of the forward biased one of the switching transistors.

10. A transistorized inverter as set forth in claim 9 in which said source means includes a pair of capacitors connected in series across a voltage source and in which said switching transistors have output circuits serially connected across said voltage source, and in which said output circuit path is connected between the junction of said capacitors and the junction of said switching transistor output circuits.

11. In a transistorized inverter, a pair of switching transistors for providing power from a power source to a load whenever one of said switching transistors is forward biased, switching means including first drive means for providing first drive signals for forward biasing a first one of said switching transistors during a portion of a control cycle, second drive means for providing second drive signals for forward biasing the second switching transistor during a different portion of the control cycle, circuit means including transformer means having a plurality of windings for coupling said first and second drive signals to said first and second switching transistors at alternate times during said control cycle and a feedback winding operative to provide a regenerative drive current for the enabled one of the switching transistors which is proportional to the collector current of said one transistor, enabling means for providing logic level pulses for controlling selective enablement of said first and second drive means, and turnoff means including a further winding on said transformer means and a control transistor enabled by a further logic level pulse provided by said enabling means at a predetermined time after either of said drive transistors is enabled to effectively short circuit said further winding to effect the turnoff of the forward biased one of said switching transistors.

12. In a transistorized inverter, a pair of switching transistors for providing power from a source to a load whenever one of said switching transistors is forward biased, switching means including first drive means operable when enabled to provide first drive signals for enabling turn on of a first one of said switching transistors, second drive means operable when enabled to provide second drive signals for enabling turn on of the second switching transistor, transformer means having a plurality of control windings for coupling said first and second drive signals to said first and second switching transistors, enabling means for providing pulses for enabling said first and second drive means, respectively, at alternate times during a control cycle, and turn off means including a control transistor having an output circuit and a further winding of said transformer connected to the output circuit of said control transistor, said control transistor being enabled by further pulses provided by said enabling means at a predetermined time after the enabling of each of said drive means to short circuit said further winding thereby providing a short circuit across said control windings for effecting controlled turn off of said switching transistors.

\* \* \* \* \*